Sept. 22, 1936.  P. M. STIVENDER  2,055,138
REGULATING SYSTEM
Filed Dec. 8, 1933  2 Sheets-Sheet 1

Inventor
P. M. Stivender
by
Attorney

Sept. 22, 1936.   P. M. STIVENDER   2,055,138
REGULATING SYSTEM
Filed Dec. 8, 1933     2 Sheets-Sheet 2

Inventor
P. M. Stivender
by
Attorney

Patented Sept. 22, 1936

2,055,138

UNITED STATES PATENT OFFICE 2,055,138

REGULATING SYSTEM

Paul M. Stivender, West Allis, Wis., assignor to Allis-Chalmers Manufacturing Company, Milwaukee, Wis., a corporation of Delaware Application December 8, 1933, Serial No. 701,432

21 Claims. (Cl. 171—224)

This invention relates in general to a regulating system for parallel connected dynamo electric machines, and more particularly to such a system in which it is desired to automatically maintain an equal or uniformly proportional division of load among the various machines irrespective of the number of machines connected in parallel.

An object of the invention is to provide a regulating system for a plurality of parallel connected generators or motors which will automatically maintain equal or uniformly proportional loads on a variable number of parallel connected generators or motors.

Another object of the invention is to provide a regulating system for a plurality of parallel connected dynamo electric machines each having interconnected load responsive windings associated therewith for controlling the excitation thereof and including switching means for deenergizing the windings associated with a machine which has been disconnected from the remaining parallel connected machines so as to render the remaining load responsive windings effective to control the excitation of the remaining machines to maintain equal or uniformly proportional loads thereon.

Another object of this invention is to provide a regulating system for a plurality of generators which supply energy to a plurality of translating devices connected thereto and which are connected in parallel by sectionalizing switches, the system including individual regulating means each having a plurality of interconnected load responsive windings and switches operated in response to the disconnecting movement of a sectionalizing switch to automatically deenergize the load responsive windings so as to automatically maintain equal or uniformly proportional load division on the remaining parallel connected generators.

A further object of the invention is to provide a regulating system having a plurality of magnetic devices each having a boosting winding and a plurality of bucking windings so interconnected as to define a plurality of independent series parallel circuits, each circuit including one boosting winding associated with a magnetic device and a plurality of bucking windings severally associated with the other of said magnetic devices.

A still further object of the invention is to provide a regulating system having a plurality of magnetic devices each having a boosting winding and a plurality of bucking windings, each boosting winding having a plurality of different bucking windings connected in series with each other and across said boosting winding, and switches arranged to deenergize the windings of any one of the magnetic devices so that the total mmf. of the bucking windings of each other device remains equal and opposite to the mmf. of the remaining boosting windings respectively.

These and other objects and advantages are attained by this invention, various novel features of which will be apparent from the description and drawings herein, and will be more particularly pointed out in the claims.

Various illustrative examples of the application of this invention are shown in the accompanying drawings in which.

Figure 1:
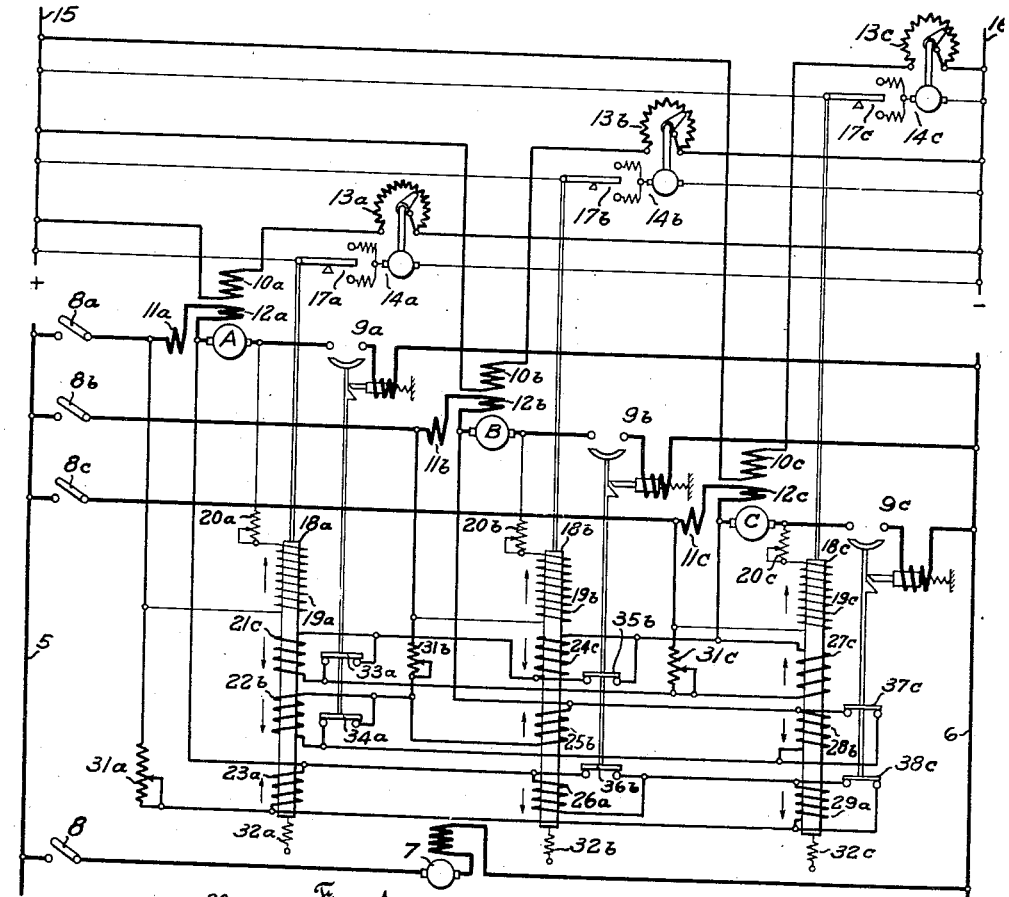
Fig. 1 is a schematic diagram of a regulating system embodying features of the present invention.

Referring now to Fig. 1, 5 and 6 are positive and negative buses across which a translating device 7, here shown as an electric motor, is connected by means of switch 8. A plurality of dynamo electric machines A, B and C, here shown as direct current generators driven by prime movers (not shown), are connectable across buses 5 and 6 by means of disconnecting switches 8a, 8b and 8c and overload circuit breakers 9a, 9b and 9c respectively. Machines A, B and C are provided with separately excited field windings 10a, 10b and 10c respectively, and interpole windings 11a, 11b and 11c respectively. These machines are also provided with windings 12a, 12b and 12c which are preferably compensating windings, however, they may also be series compound windings. The excitation of the separately excited field windings 10a, 10b and 10c is controlled by field rheostats 13a, 13b and 13c respectively which are selectively operated in one or another direction by means of reversible pilot motors 14a, 14b and 14c respectively, noting that these field windings and pilot motors receive their energization from a control bus having conductors 15 and 16 which are preferably connected to a source of power (not shown).

Each of the above described pilot motor actuated rheostats is controlled by means of a regulating device, here shown as of the solenoid relay type. These regulating devices have pilot motor controlling contact mechanisms 17a, 17b and 17c respectively which, as here shown, are actuated by magnetic core members 18a, 18b and 18c respectively. The regulating devices are provided with voltage responsive windings 19a, 19b and 19c which are connected across the armature and series windings of machines A, B and C respectively, noting that rheostats 20a, 20b and 20c are connected in series therewith. The regulating device associated with machine A is provided with bucking windings 21c and 22b which are energized in accordance with the load on machines C and B respectively, and is also provided with a boosting winding 23a which is connected across interpole winding 11a and winding 12a through adjusting rheostat 31a. The regulating device associated with machine B is provided with bucking windings 24c and 26a which are energized in accordance with the load on machines C and A respectively, and is also provided with a boosting winding 25b which is connected across interpole winding 11b and winding 12b through adjusting rheostat 31b. The regulating device associated with machine C is provided with bucking windings 28b and 29a which are energized in accordance with the load on machines B and A respectively, and is also provided with a boosting winding 27c which is connected across interpole winding 11c and winding 12c through adjusting rheostat 31c. The regulating devices are provided with springs 32a, 32b and 32c respectively which serve to assist in balancing the magnetic pull on core members 18a, 18b and 18c due to the potential winding thereon.

Figure 3:
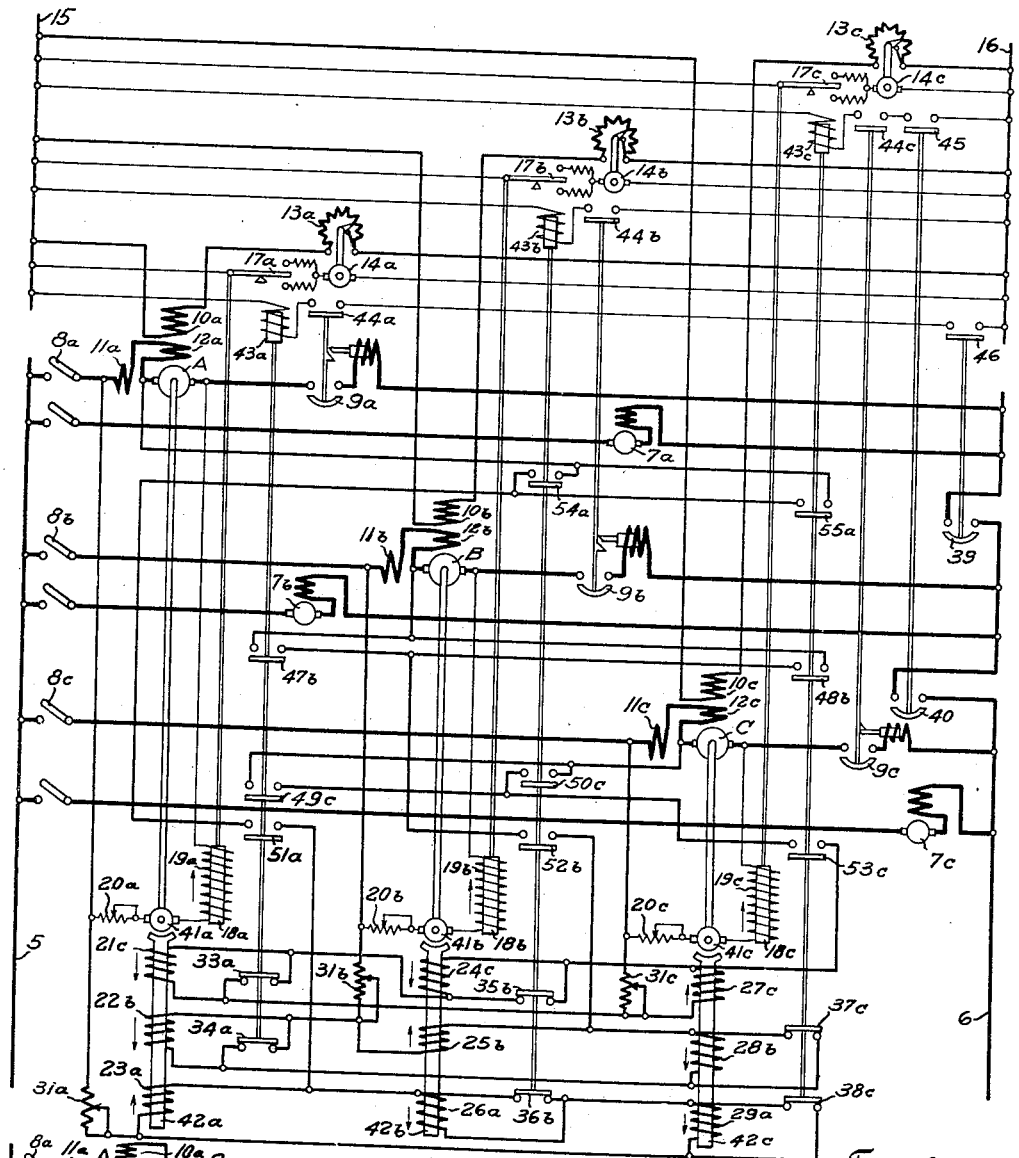
Fig. 3 is a schematic diagram of another form of regulating system embodying features of the present invention.

Overload circuit breaker 9a, as here shown, is provided with back contacts 33a and 34a which are adapted to short circuit bucking windings 21c and 22b respectively. Circuit breaker 9b, as here shown, is provided with back contacts 35b and 36b which are adapted to short circuit bucking windings 24c and 26a respectively. Circuit breaker 9c, as here shown, is provided with back contacts 37c and 38c which are adapted to short circuit bucking windings 28b and 29a respectively. Although the above described back contacts are shown as mechanically connected to the respective circuit breakers, it is to be understood that these contacts may be operated by relays controlled by the respective circuit breakers as shown in Fig. 3.

When circuit breakers 9a, 9b and 9c are in their closed positions, the various bucking windings will not be short circuited, noting that bucking windings 26a and 29a are connected in series with each other and across boosting winding 23a, and that bucking windings 22b and 28b are connected in series with each other and across boosting winding 25b, and that bucking windings 21c and 24c are connected in series with each other and across boosting winding 27c. The hereinabove described bucking and boosting windings preferably have the same number of turns and the same resistance, however since certain of these windings may in practice be spaced further away from the solenoid cores than others, it is sometimes desirable to provide the bucking windings with auxiliary parallel connected resistors. Since the boosting windings 23a, 25b and 27c are connected across the interpole and compensating windings of the respective machines, they will each have a definite mmf. when the currents flowing through machines A, B and C are equal, and since the bucking windings energized in accordance with the load on the various machines are connected in series across various boosting windings, they will each have a definite mmf. which, in the embodiment shown, will be one-half of the mmf. of the boosting windings. It is thus seen that with equal loads on each machine the total mmf. of the bucking windings of each regulating device will equal and oppose the mmf. of the boosting winding associated therewith, that is, the resultant mmf. of the bucking and boosting windings and each regulator will be zero when the loads on the respective machines are equal.

Although the invention has been shown as applied to a regulating system having three dynamo electric machines, it is to be understood that it may be extended to a greater number of machines simply by connecting the additional bucking windings of the additional machines in series with the other bucking windings. For example, in a machine having $n$ number of dynamo electric machines, each regulating device will have one voltage responsive winding, one boosting winding cumulatively related to the voltage coil and $n-1$ bucking windings. Inasmuch as each bucking winding carries $$\frac{1}{n-1}$$

of the current in the boosting windings, it follows that for any number of machines the total mmf. of the bucking windings will equal and oppose the mmf. of the boosting winding associated therewith when the loads on the respective machines are equal.

It is to be noted that the use of additional bucking windings will reduce the current in the other bucking windings, however, since each regulating device will then have additional bucking windings, the same essential relation of these windings will exist, namely that the total mmf. of the bucking and boosting windings of each regulating device should equal zero when the loads on the various machines are equal.

The operation of Fig. 1 is as follows: Assuming that switches 8, 8a, 8b, 8c and circuit breakers 9a, 9b and 9c are all in their closed position and that generators A, B and C are delivering currents of equal value to bus conductors 5 and 6 and that the voltage across bus conductors 5 and 6 is normal, the magnetic core members 18a, 18b and 18c will remain in their neutral positions and pilot motors 14a, 14b and 14c will remain idle. If, after increase or decrease of the load on translating device 7, the currents through the machines A, B and C remain equal, no regulating action will occur unless the increase or decrease of load was such as to cause an appreciable change in the voltage of the generators. If the above described change in load causes the voltage on bus conductors 5 and 6 to drop, the magnetic pull on each core member 18a, 18b and 18c will be decreased thereby permitting springs 32a, 32b and 32c to move contact mechanisms 17a, 17b and 17c to their upper positions thereby causing pilot motor 14a, 14b and 14c to move rheostats 13a, 13b and 13c in such a direction as to increase the excitation of windings 19a, 19b and 19c respectively. If the voltage across bus conductors 5 and 6 rises, magnetic core members 18a, 18b and 18c will be caused to move upwardly thereby causing pilot motors 14a, 14b and 14c to operate in such a direction as to decrease the excitation of field windings 19a, 19b and 19c. It is thus seen that with equal loads on the various generators, voltage coils 19a, 19b and 19c are effective to maintain constant voltage on bus conductors 5 and 6, noting that the magnitude of this voltage may be controlled by adjusting rheostats 20a, 20b and 20c respectively.

It seldom occurs that increases or decreases of load will be divided equally among a plurality of parallel connected generators and the present invention provides means for automatically equalizing the loads on the various machines irrespective of the number of machines in parallel and without the necessity of manual adjustment of the regulators upon the disconnection of one or more machines. Assuming that the loads on generators A, B and C has changed so that generator A is carrying more than its share of the load, the mmf. of boosting winding 23a will then be greater than the combined mmf. of the bucking windings 21c and 22b thereby causing core member 18a to move upwardly and thereby cause pilot motor 14a to rotate in such a direction that the excitation of field winding 10a is decreased which thus tends to reduce the load on generator A. At the same time the mmf. of bucking windings 26a and 29a will increase so that the magnetic core members 18b and 18c are moved downwardly thereby causing pilot motors 14b and 14c to rotate in such a direction as to increase the excitation of field windings 10b and 10c respectively. The various regulating devices will thus operate to reduce the load on generator A and increase the loads on generators B and C until the total load is divided equally among the generators at which time the regulating devices will return to their normal positions. It is to be understood that any well known anti-hunting mechanism may be used to prevent the various regulating devices from actuating the various pilot motor operated rheostats more than necessary.

Assuming that the loads on generators A, B and C have changed so that generator A is carrying less than its share of the load, then the mmf. of boosting winding 23a will not completely neutralize the mmf. of bucking windings 21c and 22b and magnetic member 18a will therefore be moved downwardly to cause pilot motor 14a to rotate in such a direction as to increase excitation of field winding 10a. The decreased mmf. of bucking windings 26a and 29a will cause magnetic members 18b and 18c to move upwardly thereby causing pilot motors 14b and 14c to rotate in such a direction as to decrease the excitation of field windings 10b and 10c respectively in substantially the same manner as above described. Similarly the above described regulating apparatus will operate to increase or decrease the excitation of any generator carrying less or more than its share of the load, and it is thus seen that for any number of generators the regulating apparatus will operate to maintain a constant voltage and equal division of load among the respective generators.

Assuming that a fault condition occurs in any one of the generators, for example, generator C, overload circuit breaker 9c will trip open thereby disconnecting this generator from bus conductors 5 and 6 and simultaneously short circuiting boosting windings 28b and 29a. Since the current through windings 11c and 12c is thus reduced to zero, regulating windings 27c, 24c and 21c will be deenergized thus tending to unbalance the zero resultant mmf. relays of the boosting and bucking windings on the regulators associated with generators A and B, however, the short circuiting of bucking windings 28b and 29a causes the currents in bucking windings 22b and 26a to increase thereby restoring the zero resultant mmf. relation and thus permitting the regulators associated with generators A and B to remain effective to maintain constant voltage and equal load division. Similarly the tripping of any of the other circuit breakers instead of 9c will short circuit the bucking windings of the regulator associated therewith and will permit the remaining machines (at least two) to continue regulating for constant voltage and equal load division, noting that this operation is possible primarily due to the fact that the bucking windings are connected in series with each other and across a boosting winding as hereinbefore described.

Figure 2:
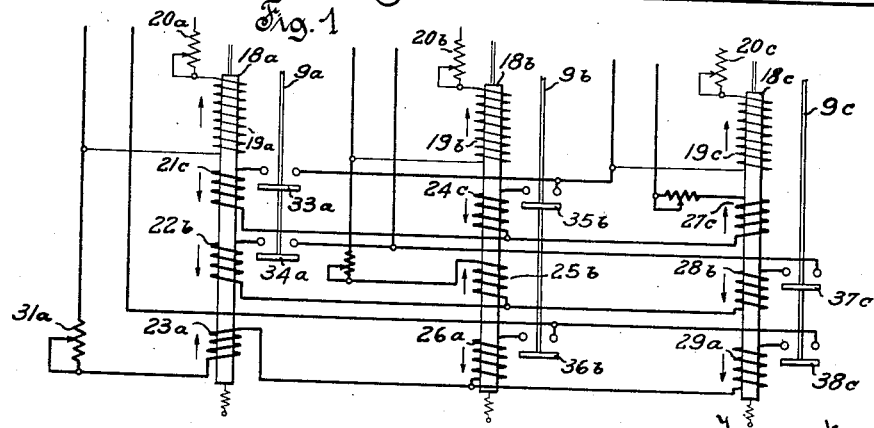
Fig. 2 is a schematic diagram of a modified portion of the system of Fig. 1.

Fig. 2 shows a portion of Fig. 1 with the bucking and boosting windings connected in a different manner. It is to be noted that in Fig. 2 the various bucking windings are adapted to be connected in parallel with each other by the various switches which are operated by the overload circuit breakers 9a, 9b and 9c, and the various boosting windings are connected in series with the various parallel connected bucking windings. For example, bucking windings 26a and 29a are adapted to be connected in parallel by switches 36b and 38c and boosting winding 23a is connected in series with these bucking windings. It is to be understood that a regulating system, such as shown in Fig. 1 and provided with bucking and boosting windings connected as shown in Fig. 2, would operate in substantially the same manner as described in connection with Fig. 1.

Fig. 3 shows a regulating system in which the automatic deenergization of the various bucking and boosting windings is accomplished upon the disconnection of one or more of the parallel connected generators whether this disconnection be accomplished by an overload circuit breaker or by means of sectionalizing switches such as 39 and 40. In Fig. 3 translating devices 7a, 7b and 7c are connectible across the generators A, B and C respectively in order that these translating devices may be severally energized from the respective generators or energized from two or more of these generators connected in parallel, noting that sectionalizing switch 39 in its open position isolates generator A and translating device 7a from the other machines, and that sectionalizing switch 40 in its open position isolates generator C and translating device 7c from the other machines.

In Fig. 3 the regulating devices associated with the respective machines are somewhat different, noting for example that the regulating device associated with generator A comprises a voltage responsive relay having winding 19a and core member 18a. An auxiliary generator 41a driven by generator A or by an auxiliary prime mover has an armature connected in series with winding 19a and has a field core diagrammatically indicated by 42a provided with bucking windings 21c and 22b and a boosting winding 23a which are interconnected in substantially the same manner as disclosed in connection with Fig. 1. Although auxiliary generator 41a is diagrammatically shown as having a single field pole, it is to be understood that the various field windings thereof are actually distributed among a plurality of field poles in a conventional manner. The bucking and boosting windings of the regulator associated with machine A are deenergized by mean of contacts 33a, 34a and 51a of relay 43a which is controlled by front contacts 44a on overload circuit breaker 9a and front contacts 46 on sectionalizing switch 39. Relay 43a is also provided with additional contacts 47b and 49c the purpose of which will be described hereinafter. Similarly the bucking and boosting windings of the regulators associated with machine B are deenergized by means of contacts 35b, 36b and 52b, noting that relay 43b which is controlled by front contact 44b shown on overload circuit breaker 9b, is also provided with additional contacts 54a and 50c for a purpose which will be described hereinafter. Similarly the bucking and boosting windings of the regulator associated with the machine C are deenergized by contacts 37c, 38c and 53c of relay 43c, the energization of which is controlled by front contacts 44c on overload circuit breaker 9c and front contacts 45 on sectionalizing switch 40, noting that relay 43c has additional contacts 55a and 48b for a purpose which will be described hereinafter.

The operation of Fig. 3 is as follows: Assuming that sectionalizing switches 39 and 40 are closed and that all of the generators and translating devices are connected in parallel across bus conductors 5 and 6 and that the loads on the respective generators are equal, the total mmf. of the bucking and boosting windings of each regulator will be zero and the armature voltage of exciters 41a, 41b and 41c will therefore also be zero. Voltage windings 19a, 19b and 19c are therefore effective to maintain constant voltage on bus conductors 5 and 6 in a manner substantially the same as described in connection with Fig. 1.

Assuming that the load on the generators changes so that generator A is carrying more than its share of the load, then the mmf. of boosting winding 23a will be greater than the total mmf. of the bucking windings 21c and 22b thereby causing auxiliary generator 41a to produce a voltage cumulative with respect to normal voltage on winding 19a thereby increasing the energization of winding 19a. The increased magnetic pull on core member 18a operates switch mechanism 17a and thus causes pilot motor 14a to rotate rheostat 13a in such a direction as to decrease the excitation of field winding 10a. At the same time the mmf. of bucking windings 26a and 29a is decreased thereby causing auxiliary generators 41b and 41c to produce voltages which oppose the normal voltage impressed on windings 19b and 19c respectively, thereby decreasing the energization of windings 19b and 19c. The decreased pull on core members 18b and 18c causes contact mechanisms 17b and 17c to energize pilot motors 14b and 14c in such a direction as to increase the excitation of field windings 10b and 10c respectively. Similarly if generator A is carrying less than its share of a load, the regulator associated therewith will operate to increase the excitation thereof and the regulators associated with generators B and C will operate to decrease the excitation of field windings 10b and 10c in a manner apparent from the above description.

If a generator, such as A, is disconnected from circuit for any reason, as for instance, through action of an operator when the total load is relatively light, actuation of the circuit breaker 9a to open position causes opening of contacts 44a, thus deenergizing relay 43a. Relay 43a in moving to its lower position causes contacts 33a and 34a to short circuit bucking windings 21c and 22b and also deenergizes boosting winding 23a and bucking windings 26a and 29a by opening contact 51a. The opening of contacts 47b and 49c at this time causes no control operations inasmuch as they are shunted by contacts 48b and 50c respectively.

If it is desired to energize translating device 7a solely from generator A, sectionalizing switch 39 may be opened thereby disconnecting generator A from the parallel connected generators B and C. The opening of sectionalizing switch 39 also opens contacts 46 (noting that contacts 44a are closed at this time) thereby deenergizing relay 43a. The downward movement of relay 43a deenergizes the bucking and boosting windings of the regulator associated with generator A in the manner described in the preceding paragraph.

If it is further desired to energize translating device 7c solely from generator C, sectionalizing switch 40 may be opened. The opening of sectionalizing switch 40 also opens contact 45 and thus deenergizes relay 43c. Relay 43c upon moving downward short circuits bucking windings 28b and 29a by means of contacts 37c and 38c and disconnects boosting winding 27c, noting that winding 27c is normally connected across interpole winding 11c and compensating winding 12c by means of contacts 53c and 50c. The regulator associated with generator C will then function as a constant voltage regulator to supply translating device 7c with a voltage which may be varied by means of rheostat 20c. If overload circuit breaker 9c trips at a time when sectionalizing switch 40 is closed and sectionalizing switch 39 is open, relay 43c will move downward and will deenergize boosting and bucking windings 27c, 28b and 29a in the manner above described. It is to be noted that under these conditions contacts 47b and 48b will both be open thus disconnecting boosting winding 25b and thus permitting the regulating device associated with generator B to act as a constant voltage regulator controllable by rheostat 20b. Although the overload circuit breakers and sectionalizing switches may be opened or closed in a great number of different ways or combinations, the main results accomplished by the operation of these switches have been described and it will be apparent from inspection of the drawings that proper regulating action will be obtained no matter what the operating positions of the various sectionalizing switches and circuit breakers may be.

It will be apparent that instead of having the auxiliary generators 41a, 41b, 41c of Fig. 3 in series with the voltage windings 19a, 19b, 19c, respectively, the latter windings may be supplied wholly from the terminals of the respective generators, with each of the auxiliary generators supplying energy to an auxiliary winding provided on the core 18a, 18b, 18c of its respective regulator and producing through such windings cumulative or differential energizing effects on such cores as may be required to produce the desired balanced regulation of the main generators.

Figure 4:
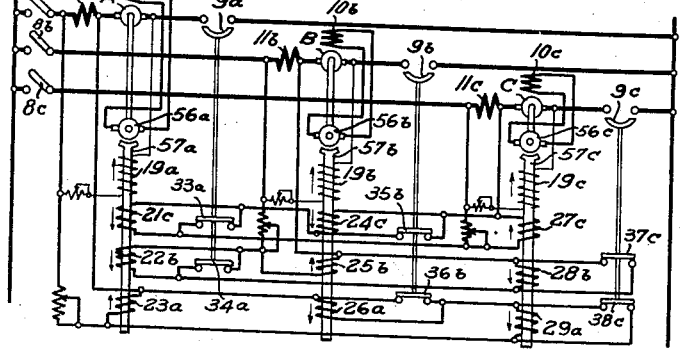
Fig. 4 is a schematic diagram of another form of regulating system embodying features of the present invention.

Fig. 4 shows a regulating system in which the generators A, B and C are connectable in parallel by means of overload circuit breakers 9a, 9b and 9c. Auxiliary generators 56a, 56b and 56c are preferably driven by generators A, B and C, although they may be driven by separate prime movers. If there are $n$ number of exciters, each exciter will have one main field winding, herein indicated as being separately excited from the armature of the main generator A, and preferably with a suitable regulating rheostat included in the circuit of such field winding, and one load responsive boosting winding and $n-1$ load responsive bucking windings. For example, exciter 56a has a magnetic pole member 57a on which are wound voltage responsive winding 19a, boosting winding 23a and bucking windings 21c and 22b. It is to be noted that the field windings of the various exciters in Fig. 4 are connected in the same manner as described in connection with Fig. 1, however, it is to be understood that they may also be connected as shown in Fig. 2. During normal conditions, each exciter will generate a voltage due solely to its voltage responsive winding inasmuch as bucking windings thereon normally cancel the mmf. of the boosting winding thereon. It will thus be apparent from the above description in connection with Figs. 1 and 3 that any unbalance of current among the various generators will cause the exciters to raise or lower their voltage and thereby maintain the loads on the various generators equal. It will also be apparent from the above description that the disconnection of any one or more of said generators upon overload will deenergize the corresponding bucking windings so that the remaining parallel connected generators will be automatically rendered effective to regulate in the manner that will be apparent from the above description. In some instances, it may be desirable to omit exciters 56a, 56b and 56c and to connect the various voltage responsive windings, boosting windings and bucking windings so as to energize the field poles of the main generators A, B and C directly. For example, winding 10a of generator A may be substituted by windings of the relative proportions of and connected in circuit similar to 19a, 21c, 22b and 23a.

It will be apparent that where the machines A, B, C are not of the same normal rating, the several boosting and bucking windings acting on the extended cores of the regulators are suitably dimensioned to provide the ampere turns required for producing the desired regulating effects on any departure from the desired proportional distribution of load on the several machines; and where reference is made herein to equalizing the load division or the maintenance of equal load division on the several machines, it is contemplated that such expressions apply as well to the maintenance of uniformly proportional loads on the several machines, where the loads on the several machines are desired to be maintained at unequal values.

Although the above described embodiments have been shown as being direct current generators, it is to be understood that the invention is also applicable to the control of direct current motors, through regulation of the fields of the motors, or generators supplying such motors, where it is desired to maintain constant relative load on such motors. And the invention is also applicable to the control of a plurality of alternating current generators supplying a common load for balancing the wattless component of load between the several generators where it is desired to maintain constant bus voltage, in which case the current coils on the core element of each regulator should be connected in a phase or phases substantially at right angles to the potential coil; and the invention is likewise applicable to the control of a plurality of alternating current motors where it is desired to maintain constant relative loads on such motors.

Although but a few embodiments of the present invention have been illustrated and described, it will be apparent from the following description that various changes and modifications may be made therein without departing from the spirit of the invention or from the scope of the appended claims.

It is claimed and desired to secure by Letters Patent:

1. In combination, more than two dynamo-electric machines each having a field winding, switching means selectively operable to connect two or more of said machines in parallel, means for individually varying the excitation of said field windings respectively, and means for automatically controlling each of said excitation varying means respectively so as to secure a substantially constant proportional distribution of the loads on the machines connected in parallel, each of said controlling means comprising a winding energized in accordance with the load on the machine associated therewith and other windings each energized in accordance with the load on one of a plurality of said other parallel connected machines, said other windings normally neutralizing said first mentioned load energized winding.

2. In combination, more than two dynamo-electric machines each having a field winding, switching means for selectively connecting two or more of said machines in parallel, means for varying the excitation of each of said field windings, means for automatically controlling each of said excitation varying means individually so as to secure a substantially constant proportional distribution of the loads on the machines connected in parallel, each of said controlling means comprising a boosting winding energized in accordance with the load on the machine associated therewith, and each further comprising additional energizing means energized in dependence upon the load on each of the other parallel connected machines, and auxiliary switches operable to render said additional energizing means independent of a machine which is disconnected from the other of said parallel connected machines so as to normally maintain a desired minimum resultant electromagnetic effect on the controlling means of the remaining parallel connected machines.

3. In combination, more than two dynamo-electric machines each having a field winding, switching means for selectively connecting said machines in parallel, means for varying the excitation of each of said field windings, means for automatically controlling each of said excitation varying means so as to secure a substantially constant proportional distribution of the loads on the machines connected in parallel, each of said controlling means comprising a boosting winding energized in accordance with the load on the machine associated with said controlling means respectively and comprising a plurality of bucking windings energized in accordance with the load on each of the other of said machines respectively, and means actuated upon disconnecting movement of one of said switching means to deenergize the windings of the controlling means associated with the disconnected machine.

4. In combination, more than two dynamo-electric machines each having a field winding, switching means for connecting said machines in parallel, a plurality of devices arranged to individually vary the excitation of said field windings respectively, a plurality of electromagnetic devices arranged to control said excitation varying devices respectively to maintain a substantially constant proportional distribution of loads on said machines, said electromagnetic devices each comprising a boosting winding connected for energization in accordance with the load on the machine associated with the respective electromagnetic device, and each comprising a plurality of bucking windings each connected for energization in accordance with the load on the individual ones of the other of said parallel connected machines respectively, said bucking and boosting windings being so proportioned that their combined magnetic effect on each of said electromagnetic devices is zero when the loads on said machines are equal, and means responsive to the disconnection of one of said machines to rearrange the connections of said bucking windings so that the combined magnetic effect of the remaining bucking and boosting windings for each electromagnetic device is zero when the loads on said remaining parallel connected machines are equal.

5. In combination, a plurality of dynamo-electric machines each having a field winding, a plurality of translating devices, switches arranged to connect said translating devices with said machines respectively, at least one sectionalizing switch arranged to selectively connect two or more of said machines in parallel, a plurality of devices arranged to individually vary the excitation of said field windings respectively, a plurality of electromagnetic devices arranged to control said excitation varying devices respectively so as to maintain a predetermined division between the loads on said machines, said electromagnetic devices each comprising a winding energized in accordance with the load on the machine controlled thereby and comprising a plurality of differential windings energized in accordance with the load on the other parallel connected machines, and switching means operable in response to the opening of one of said sectionalizing switches for deenergizing certain of said differential windings.

6. In a regulating system for a plurality of parallel conected dynamo-electric machines, the combination of a plurality of excitation regulating devices each having a winding energized in accordance with the load on one of said machines and each having a plurality of windings energized in accordance with the load on the other of said parallel connected machines respectively, the windings of the respective regulating devices which are energized in accordance with the load on the same machine being connected in series-parallel, and switching means for selectively deenergizing certain of said windings.

7. In a regulating system for more than two parallel connected dynamo-electric machines, the combination of a plurality of devices for regulating the excitation of said machines, each of said regulating devices having a boosting winding arranged to be energized in accordance with the load on the machine associated with the respective device and each of said regulating devices having a plurality of bucking windings arranged to be energized in accordance with the load on each of the other of said machines respectively, and switch means selectively operable to deenergize the windings of one or more of said regulating devices, the windings of each of said devices being so connected and proportioned that the total mmf. of the energized bucking windings thereof normally equals and opposes the mmf. of the energized boosting winding thereof.

8. In combination, a plurality of magnetic devices each having a boosting winding and a plurality of bucking windings, means defining a plurality of circuits each including one of said boosting windings and a plurality of said bucking windings connected in series with each other and across said one of said boosting windings, each winding included in each circuit being associated with a different one of said magnetic devices, and means for selectively rendering ineffective the bucking and boosting windings of any of the said magnetic devices without affecting the desired operation of the remaining one or ones of said magnetic devices.

9. In combination, a plurality of magnetic devices each having a boosting winding and a plurality of bucking windings, and means defining a plurality of circuits each including one of said boosting windings and a plurality of said bucking windings connected in series with each other and across said one of said boosting windings, each winding included in each circuit being associated with a different one of said magnetic devices, and each of said boosting and bucking windings having substantially the same number of turns.

10. In combination, a plurality of magnetic devices each having a boosting winding and a plurality of bucking windings, means defining a plurality of circuits each including one of said boosting windings and a plurality of said bucking windings connected in series with each other and across said one of said boosting windings, each winding included in each circuit being associated with a different one of said magnetic devices, and a plurality of switches selectively operable to short-circuit the bucking windings associated with said magnetic devices respectively.

11. In combination, $n$ number of magnetic devices, $n$ being greater than two, each having one boosting winding and $n$ minus one bucking windings arranged to excite said magnetic devices, means defining $n$ circuits for energizing all of said windings, each circuit including $n$ minus one bucking windings connected in series with each other and across one of said boosting windings, each winding included in each of said circuits being associated with a different one of said magnetic devices, and means for selectively rendering ineffective the bucking and boosting windings of any of the said magnetic devices without affecting the desired operation of the remaining one or ones of said magnetic devices.

12. In combination, $n$ number of magnetic devices, $n$ being greater than two, each having one boosting winding and $n$ minus one bucking windings arranged to excite said magnetic devices, means defining $n$ circuits for energizing all of said windings, each circuit including $n$ minus one bucking windings connected in series with each other and across one of said boosting windings, each winding included in each of said circuits being associated with a different one of said magnetic devices, said windings being so proportioned that with equal voltages applied to each of said circuits the total mmf. of the bucking windings associated with each of said magnetic devices equals and opposes the mmf. of the boosting winding associated with each of said magnetic devices respectively, and switch means for selectively deenergizing the windings associated with any one of said magnetic devices so as to maintain equal and opposing mmfs. in the remaining energized windings.

13. In a regulating system, the combination of $n$ number, greater than two, of dynamo-electric machines connected in parallel, means for exciting each of said machines so as to maintain a substantially constant proportional distribution of the loads thereon comprising a voltage responsive excitation winding for each machine and $n$ differentially related load responsive excitation windings for each machine, said exciting means comprising means for connecting said load responsive windings in series-parallel relation so that each machine has one load responsive winding energized in accordance with the load thereon, and $n$ minus one load responsive windings energized in accordance with the loads on the other parallel connected machines respectively, said load responsive windings being so proportioned that the total mmf. of the load responsive windings associated with each machine normally equals zero, and means operable to selectively deenergize all of the load responsive windings of any of said machines while insuring that the mmf. of the load responsive windings associated with each of the other parallel connected machines normally remains equal to zero.

14. In a load equalizing system, the combination of $n$ number, greater than two, of generators, a translating device for each of said generators, means for selectively connecting said translating devices across said generators respectively, means selectively operable to connect two or more of said generators in parallel, each of said generators having excitation controlling means comprising a winding energized in accordance with the voltage of said generator, and each having a winding energized in accordance with the load on said generator, and each having $n$ minus one windings energized in accordance with the load on the other of said generators, said load energized windings being so proportioned and interconnected that their mmf.'s with respect to each generator exert a corrective effect thereon on departure from normal division of load on said generators to cause said generators to return toward said normal load division, and means operable in response to disconnection of one of said generators from said parallel connection for insuring that the excitation controlling means of the remaining one or more generators in parallel connected service function to maintain the desired voltage and load conditions on said generator or generators.

15. In a load equalizing system, the combination of $n$ number of generators, a translating device for each of said generators, means for selectively connecting said translating devices across said generators respectively, sectionalizing switches selectively operable to connect two or more of said generators in parallel, each of said generators having exciting means comprising a winding energized in accordance with the voltage of said generator, and each having a winding energized in accordance with the load on said generator, and each having $n$ minus one windings energized in accordance with the load on the other of said generators, said load energized windings being so proportioned and interconnected that their mmf.'s with respect to each generator are normally zero, and switching means operable in response to disconnecting movement of one of said connecting means or one of said sectionalizing switches for deenergizing the load responsive windings associated with the generator thus disconnected, said switching means being operable upon movement thereof to rearrange the interconnection of said load responsive windings that the mmf. of the remaining energized load responsive windings normally equals zero with respect to each remaining parallel connected generator.

16. In combination, more than two dynamo-electric machines each having a field winding, switching means selectively operable to connect two or more of said machines in parallel, means for individually varying the excitation of said field windings respectively, and means for automatically controlling each of said excitation varying means respectively so as to secure a substantially constant proportional distribution of the loads on the machines connected in parallel, each of said controlling means comprising a winding energized in accordance with the load on the machine associated therewith and a plurality of other windings each energized in accordance with the load on one of said other parallel connected machines.

17. In combination, more than two dynamo-electric machines each having a field winding, switching means selectively operable to connect two or more of said machines in parallel, means for individually varying the excitation of said field windings respectively, and means for automatically controlling each of said excitation varying means respectively so as to secure a predetermined desired proportional distribution of the loads on the machines connected in parallel, each of said controlling means comprising a winding energized in accordance with a characteristic of the load on the machine associated therewith and a plurality of other windings each energized in accordance with a characteristic of the load on one of said other parallel connected machines, and means operatively dependent on the connection in or disconnection from parallel relation of any of said machines for rendering effective or ineffective, respectively, the desired controlling action of the controlling means associated with said latter machine.

18. In combination, more than two dynamo-electric machines each having a field winding, switching means selectively operable to connect two or more of said machines in parallel, means for individually varying the excitation of said field windings respectively, and means for automatically controlling each of said excitation varying means respectively so as to secure a predetermined desired proportional distribution of the loads on the machines connected in parallel, each of said controlling means comprising a winding energized in accordance with an electrical characteristic of the load on the machine associated therewith and a plurality of other windings each energized in accordance with an electrical characteristic of the load on one of said other parallel connected machines, and means operatively dependent on the connection in or disconnection from parallel relation of any of said machines for rendering effective or ineffective, respectively, the desired controlling action of the controlling means associated with said latter machine and without affecting the desired controlling action of the controlling means of said other machines.

19. In combination, more than two dynamo-electric machines each having a field winding, switching means selectively connecting two or more of said machines in parallel, means for regulating the excitation effects of each of said field windings to maintain desired voltage regulation of the particular machines when operating alone, and means for automatically controlling the excitation regulating means of each of said machines individually so as to maintain a substantially constant proportional distribution of the loads on the machines connected in parallel, each of said controlling means comprising a winding energized in accordance with a characteristic of the load on the machine with which said latter controlling means is associated, and a plurality of bucking windings each energized in accordance with the load on another of several other parallel connected machines, said first windings and said bucking windings of the several controlling means being so relatively proportioned and connected that the resultant magnetic effect exerts a minimum correcting effect on said excitation regulating means when the loads on said parallel connecting machines are distributed in the desired proportion.

20. In combination, more than two dynamo-electric machines, means selectively operable to connect two or more of said machines in parallel, each of said machines having excitation controlling means comprising an exciter for a field winding of said machine, said exciter having a sectional field winding including a portion whose energization is dependent upon the load on said machine and a portion whose energization is dependent upon the load on the other machine or machines connected in parallel with said first machine, said portions of said latter field winding being so proportioned and connected with respect to the several machines as to exert a correcting effect thereon on departure from normal division of load on said machines to cause said machines to return toward said normal load division, and means operable in response to the disconnection of one of said machines from said parallel connection for insuring that the excitation controlling means of the remaining one or more generators in parallel connected service function to maintain the desired voltage and load conditions on said generator or generators.

21. In combination, more than two generators, means selectively operable to connect two or more of said generators in parallel, each of said generators having means for controlling the excitation thereof to insure desired voltage regulation of the generator when operating alone and also when operating in parallel with one or more of said other generators and to insure a predetermined division of load on the several generators when operating in parallel, said excitation controlling means comprising an auxiliary generator having a sectional field winding including a portion whose energization is dependent upon a characteristic of the load on said generator and a portion whose energization is dependent upon a characteristic of the load on the other generator or generators connected in parallel with said first generator, the portions of said latter winding being so proportioned and connected with respect to the several generators as to exert minimum corrective effect under conditions of desired division of load on said generator.

PAUL M. STIVENDER.